May 18, 1965  H. J. C. GEORGE  3,184,092
THIN-WALLED PRESSURE VESSELS AND METHOD OF MANUFACTURE
Filed Sept. 9, 1960
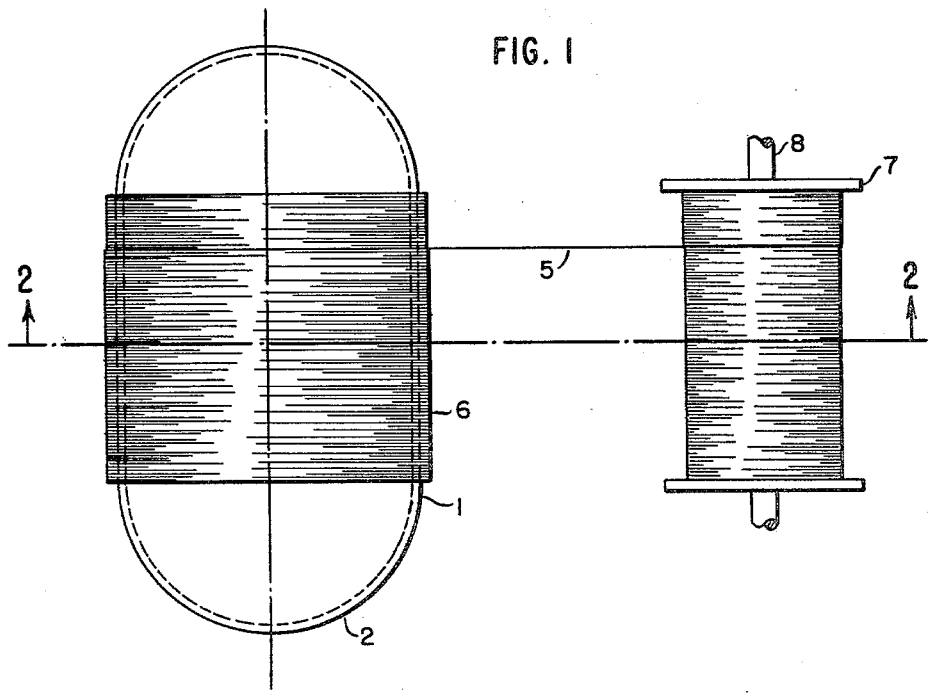
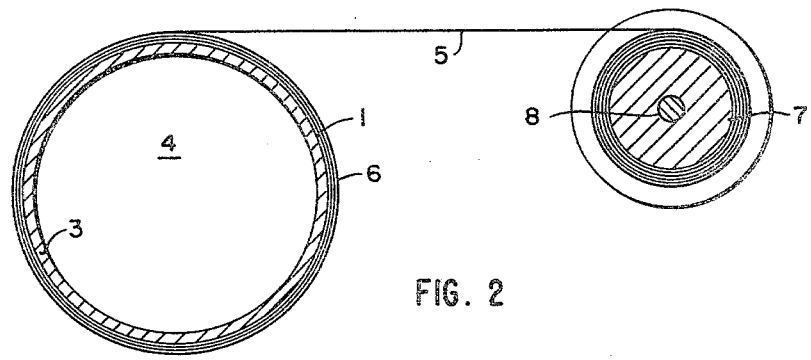
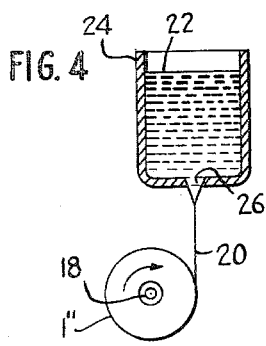
INVENTOR.
HENRI J. C. GEORGE
BY
KENWAY, JENNEY, WITTER & HILDRETH
ATTORNEYS

3,184,092
THIN-WALLED PRESSURE VESSELS AND METHOD OF MANUFACTURE

Henri J. C. George, Paris, France, assignor to Quartz & Silice S.A., Paris, France, a corporation of France
Filed Sept. 9, 1960, Ser. No. 55,080
Claims priority, application France, Sept. 10, 1959, 804,785, Patent 1,243,920
1 Claim. (Cl. 220—3)

This invention relates to thin-walled pressure vessels and the manufacture thereof, and more particularly to improved means for reinforcing a pressure vessel comprising a thin wall of metal or other material which is to be used under high temperature conditions.

Many metals used in making hollow pressure vessels, even those having high melting points, exhibit a rapid decrease in mechanical properties with rising temperature, particularly with regard to elasticity and yield point. The material of an unreinforced metallic pressure vessel must therefore be of sufficient thickness to retain the design pressure on the basis of considerably lowered elasticity and yield point when the vessel is intended to be subjected to greatly elevated temperatures in use.

It is the primary object of the present invention to provide an improved reinforced thin-walled pressure vessel, which will maintain relatively high mechanical strength under high temperature operating conditions, in spite of reduction in the mechanical strength of the material of the vessel.

It is a further object of this invention to provide an improved method for manufacturing a reinforced thin-walled pressure vessel.

Further objects and advantages of the invention will become apparent as the following description proceeds.

According to a preferred embodiment of the present invention, a thin-walled tube, receptacle, or other pressure vessel is formed of thin metal, and is subsequently wound circumferentially with one or more windings of fine quartz filaments which are subjected to a high tension, which is preferably the maximum tension compatible with the yield point of the filaments. Because quartz has a considerably lower coefficient of expansion than metals, the metal will expand more rapidly than the quartz filaments with a rise in temperature, and the compression caused by the winding will increase. A very substantial increase in the mechanical strength of the pressure vessel is provided even at these high temperatures. Quartz maintains its elastic properties even at temperatures of 1000° C., at which most metals become relatively soft. The resulting pressure vessel is thus capable of withstanding high pressures at relatively higher temperatures than those which can be contained by comparable metal pressure vessels of equal or even greater thickness, particularly at elevated temperatures.

The quartz filaments may have widely varying diameters, within a range which is compatible with good winding characteristics. The most convenient range of diameters falls between one and about thirty microns; thinner filaments are difficult to manufacture and to wind, while thicker filaments have higher fragility and are also quite difficult to wind.

According to an additional feature of this invention, the winding of the filament about the pressure vessel can be accomplished concurrently with the drawing of the filament from a heated quartz rod, by employing the pressure vessel as a drawing drum. The vessel is rotated to draw the filament under tension from a crucible in which the heated quartz rod is maintained at a drawing temperature. Alternatively, the filament may be drawn onto a drawing drum and then rewound under tension onto the pressure vessel.

While the specification concludes with claims particularly pointing out and distinctly claiming the subject matter which I regard as my invention, it is believed that the invention will be better understood from the following detailed description taken in connection with the accompanying drawing, in which:

FIG. 1 is a view showing a method of reinforcing a pressure vessel according to the invention;

FIG. 2 is a sectional view taken along line 2—2 in FIG. 1, looking in the direction of the arrows;

FIG. 3 is a schematic view showing a modified method of reinforcing a pressure vessel; and FIG. 4 is a schematic view showing a further modification of the improved method.

Referring to the drawing, a metallic pressure vessel 1 is shown by way of illustration, and is formed with hemispherical end walls 2 joining a cylindrical wall 3 to enclose a pressure chamber 4 which is intended to contain gases under high pressures at elevated temperature conditions. Such a vessel has good strength characteristics at low temperatures, but these characteristics diminish rapidly with increasing temperature, particularly with regard to the elasticity and yield point of the metal. A metal pressure vessel to be used at elevated temperatures on the order of hundreds of degrees centigrade must therefore be made with relatively thick and heavy walls.

According to the method of this invention, I wind the vessel 1 with a filament 5 of quartz to form a winding 6 about at least the cylindrical portion of the vessel, and carry the winding on under a substantial tension. The winding may be subjected to the maximum tension compatible with the yield point of the filament, and I prefer to carry on the winding under a filament tensile stress at least within the range of 100 to 300 kilograms per square millimeter. A winding 2 millimeters thick produces a tangential compression force on the vessel in the order of 150 to 400 kilograms per millimeter of length of the vessel. While the winding may be formed of a single layer, I prefer to wind the filament at least several layers thick, depending upon the strength required in the vessel.

The winding is carried on by rotatably mounting the vessel 1 on the axis shown by any suitable shaft and bearing means (not shown), and rotating the vessel to wind the filament thereon in a helical conformation. The filament 5 is supplied by means of a reel 7 rotatably supported upon an axle 8 and constrained by suitable tension braking means of any well-known type (not shown) to provide the desired winding stress. The spool 7 is prepared in a conventional manner by drawing the filament from a suitably heated quartz rod, using the spool as a drawing drum. In an alternative method which is a feature of this invention, however, the filament may be drawn directly onto the vessel 1 from a heated quartz rod, the latter being suitably heated within a crucible according to conventional practice. The method of directly winding and drawing the filament onto the vessel is illustrated in alternative forms in FIGS. 3 and 4. In FIG. 3, a vessel 1' is shown mounted for rotation in the direction shown by the arrow upon a shaft 10, and arranged to draw a quartz filament 12 from a suitably supported quartz rod 14, which is heated by a torch 16 to a fusing temperature. In FIG. 4, a vessel 1" is supported upon a shaft 18 for rotation in the direction shown by the arrow to draw a filament 20 from a molten charge of quartz 22, contained within a suitably heated crucible 24, the bottom of which has an orifice 26 to form the filament in a manner well known in the art. I have found that the direct drawing of the filament onto the vessel may afford a tensile strength as much as two or three times greater than that of filaments which have been wound on a spool and subsequently rewound on the vessel. Upon completion of the winding operation, an end of the filament is fused to the winding by local heating means, such as a torch.

The diameter of the quartz filament may vary within a wide range, but should be compatible with good winding characteristics. A particularly convenient range of diameters is from one to thirty microns. Filaments of lesser diameter are difficult to prepare and wind, while filaments of greater diameter are relatively fragile and also present difficulty in winding.

I have found that my improved pressure vessel provides greater resistance to bursting than a metal pressure vessel having a wall thickness equal to the total thickness of the metal wall and the quartz filament winding of the pressure vessel of this invention. Furthermore, my improved pressure vessel preserves its strength at high temperatures, because the quartz filament maintains its elasticity and strength up to temperatures which may reach 1000° C., at which most metals become relatively soft.

Under high temperature conditions, the metal or other material of the pressure vessel 1, having a higher coefficient of expansion than the quartz, expands more rapidly and increases the compression of the quartz winding on the vessel. The compressional strength of my improved pressure vessel is thus increased with rising temperature, in a range of temperatures lower than the melting point of the metal or other material of the vessel.

It will be apparent to those skilled in the art that the vessel may assume any desired shape, and is not limited to a cylindrical vessel. Furthermore, the ends as well as the side wall of the vessel may be wound with the quartz filament.

Various other changes and modifications will occur to those skilled in the art, and I intend to cover all such changes and modifications in the appended claim.

What I claim and desire to secure by Letters Patent of the United States is:

A pressure vessel capable of maintaining high bursting strength at temperatures in the order of about 1000° C., comprising a hollow metallic vessel which would normally be weakened at temperatures in the order of about 1000° C. to a point where said metallic vessel would rupture under its designed pressure limit, said metallic vessel having a coefficient of thermal expansion substantially greater than that of quartz, said pressure vessel having a plurality of windings of a quartz filament wound under a tension less than the yield point of said filament, said windings maintaining their tensile strength at a temperature in the order of about 1000° C. and restraining thermal expansion of said metallic vessel.

References Cited by the Examiner
UNITED STATES PATENTS

| | | | |
|---|---|---|---|
| 2,405,036 | 7/46 | Hoffman | 65—7 |
| 2,569,612 | 10/51 | Laurent | 29—452 |
| 2,579,183 | 12/51 | Freyssinet | 29—452 |
| 2,652,943 | 9/53 | Williams | 220—3 |
| 2,744,043 | 5/56 | Ramberg | 220—3 |
| 2,827,195 | 3/58 | Kearns | 220—3 |
| 2,848,133 | 8/58 | Ramberg | 220—3 |
| 2,984,868 | 5/60 | Hill | 65—7 |
| 3,045,278 | 7/62 | Potter | 65—16 |

THERON E. CONDON, *Primary Examiner.*

EARLE J. DRUMMOND, *Examiner.*